Sept. 30, 1947. G. P. HAM ET AL 2,428,328
PROCESS OF REMOVING BACTERIA FROM FLUIDS
Filed Sept. 5, 1942

INVENTORS
GARNET P. HAM,
ROBERT B. BARNES,
BY
ATTORNEY

Patented Sept. 30, 1947

2,428,328

UNITED STATES PATENT OFFICE 2,428,328

PROCESS OF REMOVING BACTERIA FROM FLUIDS

Garnet Philip Ham, Old Greenwich, and Robert Bowling Barnes, Stamford, Conn., assignors to American Cyanamid Company, New York, N. Y., a corporation of Maine Application September 5, 1942, Serial No. 457,522

5 Claims. (Cl. 204—180)

This invention relates to the removal of bacteria from fluid media.

Many fluids such as water are often contaminated with harmful bacteria to such an extent that they can not be safely used for food, beverages or medicinal purposes.

Many methods of killing bacteria have been proposed and a few of them have found wide application. None of the methods of killing bacteria which have been employed prior to our invention are completely satisfactory for all purposes and in all instances. Some methods do not kill with sufficient efficiency while other methods are too slow to be practical. Furthermore, many of the prior art methods of killing bacteria involve the introduction of a toxic material such as chlorine to the fluid medium to be purified. Water treated with chlorine has an undesirable flavor and many people risk disease rather than use the distasteful chlorine in their drinking water.

An object of our invention is to provide a method of purifying fluids contaminated with bacteria by removing the bacteria from the fluids.

Another object of our invention is to provide fluids, particularly water, having a very low or substantially no bacterial content.

In the field of biologicals it is often desirable to concentrate bacteria and the like or to remove the bacteria from the media in which they are found in order to transfer them into another desired medium.

It is, therefore, another object of our invention to provide a method of extracting bacteria and the like from fluid media for the production of biologicals as well as for various scientific uses.

The foregoing and other objects are attained by contacting a fluid medium containing bacteria or the like with a relatively inert, dielectric material which has been or which is subjected to a source of high potential, direct current electricity. This may be accomplished for example by passing a fluid such as water containing bacteria through a bed or column or a granular dielectric material to which is applied a high tension direct current by means of suitable electrodes. These electrodes are conveniently located at the top and bottom of the bed or column of the granular material. The dielectric material may be in the form of pellets, rods, tubes, etc., as well as in the granular form.

Although our process may be conducted in any suitable apparatus, the apparatus as shown in the accompanying drawing has been found to be particularly adapted for this purpose.

Figures 1, 2:
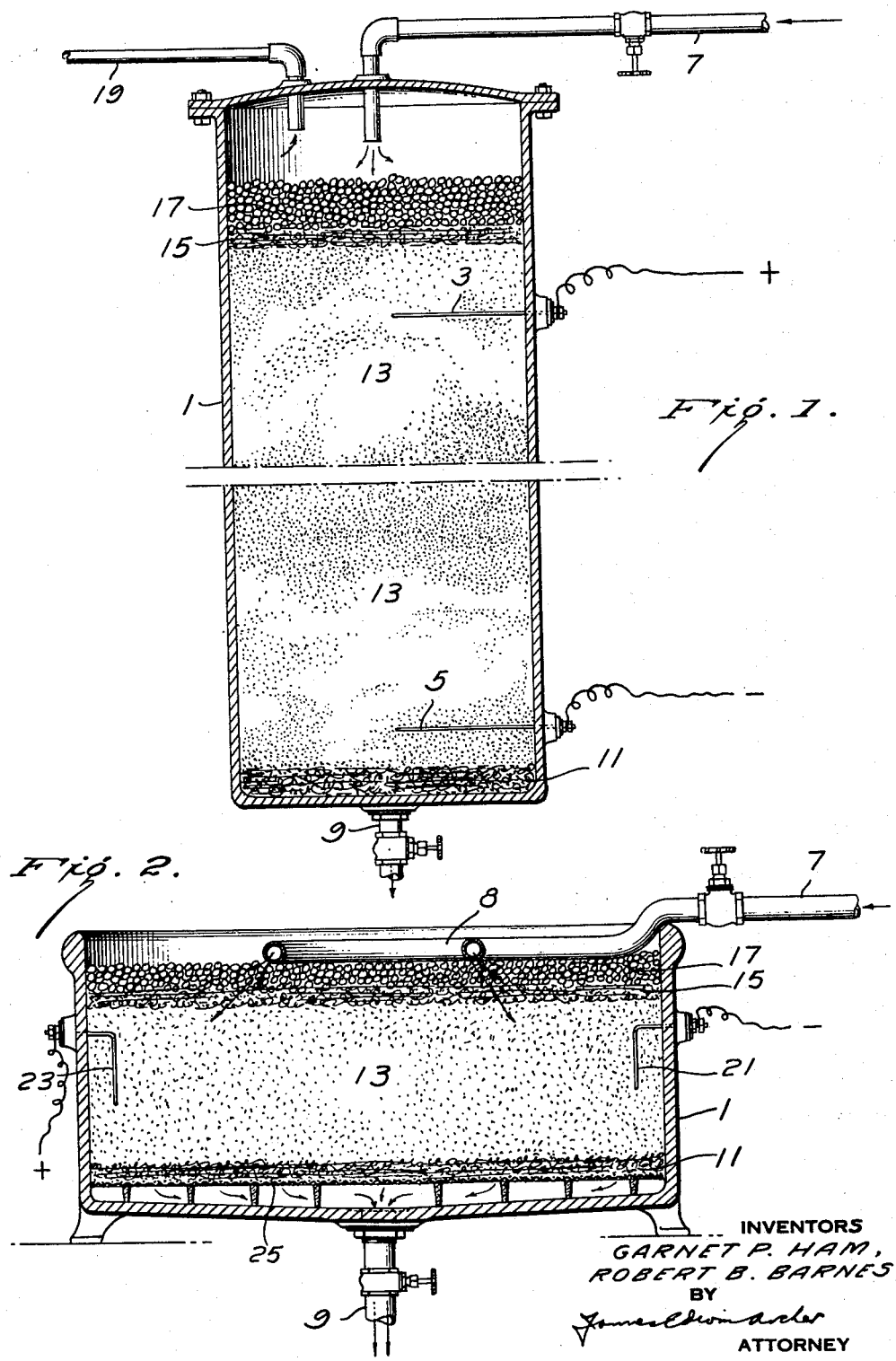
Figure 1 is a side elevation view of one form of apparatus in which our process may be carried out, the apparatus being shown partially in cross section.
Figure 2 is the same type view as Figure 1 but is a slightly different form of apparatus which is adapted for our process.

The construction of the apparatus as well as the understanding of the operation of our process will be apparent from the following:

A suitable vessel or container 1 is preferably constructed of glass, porcelain or, if constructed with metal, it is preferably lined with glass, rubber or porcelain. An electrode, preferably a platinum electrode, 3 is placed near the top of vessel 1 and it extends either a short distance or substantially entirely across the vessel. A similar electrode 5 is inserted near the bottom of the vessel 1. The electrodes 3 and 5 are suitably insulated from the vessel 1 if the latter is metallic. A high tension direct current potential is applied to the electrodes 3 and 5 by any suitable means. Preferably the electrode near the top of the vessel 1 is made the anode while the electrode near the bottom of the vessel 1 is made the cathode. The electrodes 3 and 5 may be in the form of a wire or rod, or they may be in the form of a screen or foraminous plate which partly or completely covers the horizontally cross sectional area of the vessel 1. A feed conduit 7 is connected into the top of vessel 1 while an outlet conduit 9 is connected into the bottom of vessel 1. Both conduits 7 and 9 may be constructed of materials similar to those specified for vessel 1.

A relatively thin layer of glass wool 11 may be placed in the bottom of the vessel 1 and on top of the glass wool a granular material 13 is well packed in order to avoid the channeling of the fluid passing through the apparatus. On the top of the granular material 13 another layer of glass wool 15 is placed and this in turn is followed by a layer of glass beads 17. Optionally, an overflow pipe 19 is connected into the top of the vessel 1.

Water or other fluid containing bacteria flows in through conduit 7 down through the granular material in vessel 1 and out through conduit 9. During the passage of the water a high tension direct current potential is applied to electrodes 3 and 5. The effluent flowing from conduit 9 has a substantially lower bacterial content than the feed which flows in through conduit 7.

In Figure 2, container 1 is shown as a relatively shallow vessel as compared to vessel 1, Figure 1 where the vessel is represented as a relatively long column. The feed pipe 7 in Figure 2 is connected with a perforated distributor conduit 8 which may be formed into a circle. The container 1 is provided with an outlet conduit 9. In Figure 2, electrodes 21 and 23 are inserted into the side of container 1 preferably diametrically opposite each other. A supporting screen, grate or other foraminous support is placed in the bottom of container 1. On top of the support 25 a layer or glass wool 11 is placed followed by well packed granular material 13 and this in turn is followed by another layer of glass wool 15 on top of which is a layer of glass beads 17. The operation of the apparatus shown in Figure 2 is apparent from the description of the operation of the apparatus in Figure 1. The container 1 conduits 7, 8, and 9 and support 25 may be constructed of metal, porcelain, glass, synthetic resin, or many other desired materials. If metal be used, it is preferable that it be lined with glass, porcelain or rubber.

The following examples in which the proportions are in parts by weight except as otherwise indicated are given by way of illustration and not in limitation. In order to demonstrate the high efficiency of our invention, we have used fluids contaminated with bacteria to an extremely high degree. It is apparent that the efficiency of removing bacteria from a fluid medium would be greater with a more prolonged contact with the fluid and the granular material which have been subjected to a high tension direct current potential.

*Example 1*

A glass column about ¾″ in diameter and 24″ long is provided with two platinum electrodes about 19″ apart. Each electrode consists of No. 22 gauge platinum wire and extends inside of the glass column a distance of about ½″. The electrodes are preferably relatively small in order to reduce the current density in the column as much as possible. Since our invention deals with the application of the high potential to the column of granular material but not to the passage of high currents of electricity through the column, it is to be noted that the current density employed according to our invention is insufficient to actually kill the bacteria. In this invention the top electrode is the anode although our invention contemplates the use of the anode at either the bottom or top of the column. However, it is preferable to have the anode at or near the top of the column as somewhat better results are obtained than if the positions of the anode and cathode be reversed. This is of course based upon the direction of flow being from top to bottom. We have found that the number of bacteria appears to be considerably greater in the vicinity of the anode than at the cathode.

The glass column is packed with a granular material such as fine sea sand. The sea sand used in the following test was such that 98% by weight was within the range of No. 20 to 100 mesh. The sand is washed and ignited prior to being packed in the column. Just prior to the introduction of the sand into the column it is washed with distilled water until the pH of the effluent is about 6.8 at 25° C. The entire apparatus is preferably steam sterilized at about 121° C. either before or after the sand is placed in the column. Sterilized water is passed through the sand to wash out any free contaminating material or free bacteria.

About 1 liter of a bacterial suspension containing about 500,000 colonies per cc. of *B. coli* was passed through the column at a rate of about 14 cc. per minute. The effluent was collected in about 100 cc. fractions and aliquot proportions were withheld for bacteriological plating purposes. About 1 cc. of each fraction, proportionately further diluted, was introduced into 25 cc. of nutrient agar in a Petri dish after which the sample was incubated at 37° C. for 24 hours before the bacteriological examination. The area of the Petri dishes was divided into 32 equal sections and the colonies of bacteria counted in at least 6 so that a comprehensive average for the entire group could be obtained.

The last five 100 cc. fractions were examined bacteriologically and they were found to contain an average of about 180 colonies per cc. During the passage of these fractions of effluent, a potential varying between 1,320 volts and 1,980 volts was applied to the electrodes. The current varied from about 1 m. a. to about 1.5 m. a.

Samples of sand from three different locations in the column were removed after the foregoing tests. The first portion was taken from the vicinity of the anode at the top of the column. The second portion was taken from the center of the column while the third portion was taken from the bottom of the column in the vicinity of the cathode. One gram of each sample was slurried in a 5 cc. portion of sterile water and the sand allowed to settle. After settling, 1 cc. of the water in every sample was pipetted out, diluted 1:100 and a 0.1 cc. portion used for plating purposes. A bacteriological examination showed that the first sample contained about 6,000,000 colonies per cc. of the water into which the sand was slurried. The second sample contained about 190,000 colonies per cc. while the third sample contained approximately no colonies of bacteria. This indicates that the bacteria have been removed from the feed solution and that they have not been destroyed by this procedure, but have been concentrated on the granular material.

We have also found that sand or other granular material will retain its enhanced activity for a period of time after the electrical potential has been removed. However, it is preferable that the potential be applied during the entire process.

Sand which is not charged by an electrical potential removes a very small proportion of bacteria from a fluid medium under similar conditions. In fact, if an aqueous suspension containing about 500,000 or more colonies of *B. coli* per cc. be passed through an uncharged column of sand the effluent shows no substantial reduction in the bacterial content.

*Example 2*

A bacterial suspension of pyocyaneous containing about 320,000 colonies per cc. is passed through a column of sand prepared in accordance with Example 1. About 1 liter of the suspension is passed through it at a rate of about 14 cc. per minute and the effluent is collected in about 100 cc. fractions. These were diluted, incubated and examined bacteriologically in the manner described in Example 1. The following results were obtained.

| Effluent Fractions | Potential Volts | Current in M. A. | Bacterial Counts per cc. Effluent |
|---|---|---|---|
| 1st 100 cc | 1,200 | 0.5 | |
| 2nd 100 cc | 1,200 | 0.8 | 58,000 |
| 3rd 100 cc | 1,200 | 0.9 | 90,000 |
| 4th 100 cc | 1,200 | 0.9 | 56,000 |
| 5th 100 cc | 1,200 | 0.9 | 112,500 |
| 6th 100 cc | 1,200 | 0.9 | 13,000 |
| 7th 100 cc | 1,200 | 0.9 | 72,000 |
| 8th 100 cc | 1,200 | 0.9 | 96,000 |
| 9th 100 cc | 1,200 | 0.9 | 68,000 |

The granular material may be either relatively inert or it may be an anion active material. Sand has been found to be an extremely convenient and economical material for use in our apparatus but other granular or powdered materials having similar properties may be employed. Such granular materials should be non-conductors or poor conductors of electricity, or, in other words, they should be dielectrics. Such materials should have a resistivity of at least 100,000 ohms/cm. cube. The granular materials should be substantially insoluble in the fluid to be treated, e. g., water, and they should be relatively rigid, that is to say, the particles should not collapse or coalesce to form a mush or paste. It is preferable that the materials have at least some degree of porosity, that they be water resistant, and that they be wet readily by water or other fluids to be purified. In view of these requirements it is apparent that we can not employ metals in their free state for our purpose. Examples of substances which we may use are bauxite, calcium carbonate, calcium sulfate, aluminum oxide in any form, barium sulfate, magnesium carbonate, silicon carbide, calcium phosphate, the natural clays, quartz, glass, silica gels, diatomaceous earth, sodium aluminum silicate and other complex aluminum silicates, dried insoluble proteinaceous materials, cellulose such as cotton, wood pulp, paper or cloth, etc. Substances which have cation activity are not as desirable as chemically inactive materials since there is a tendency for them to neutralize or counteract part or all of the effect introduced by the high tension electric potential.

It has been disclosed and claimed in the copending application of Robert Bowling Barnes, Serial No. 457,524, filed September 5, 1942, that anion active resins are highly effective for removing bacteria from fluid media. In another copending application of the present inventors Serial No. 457,523, filed September 5, 1942, a process is described and claimed which makes use of an electrical potential in contact with anion active resins as an improvement over the invention described in the forementioned application of Robert Bowling Barnes. It is possible to remove bacteria more efficiently and with a shorter period of contact by employing a high electrical potential in conjunction with the anion active resins. Similarly, we have found that it is possible to remove bacteria very much more efficiently and with a shorter period of contact if an electrical current is applied to sand or other relatively inert granular materials.

The mechanism by which the various processes described above extract, adsorb, occlude or otherwise withdraw bacteria from fluid material is unknown to us at this time. Accordingly, we do not intend that our invention should be limited to any particular explanation expressed or implied.

A valuable feature of our invention is that the bacteria remain in contact with the granular material in a virulent condition. The bacteria may be removed from the granular material by washing with water or other fluids and if desired they may be killed or rendered inactive by treating them with germicidal solutions or bacteriostatic solutions or subjecting them to a high potential, high frequency discharge by subjecting them to ultra-violet radiations, etc. Thus, bacteria may be collected for use in the preparation of biologicals or for use in scientific studies.

Our bacterial suspensions contain only about 0.00005 g. per cc. of sodium chloride and, therefore, with the small current density employed sufficient chlorine could not be formed to destroy any substantial number of bacteria. This was confirmed by tests with ortho-toluidine as an indicator. Furthermore, the use of Shiff's reagent failed to indicate the presence of any aldehydic materials, which in turn might impart some germicidal action.

Instead of passing the fluid containing bacteria through a bed or column of granular material which is or which has been subjected to a high tension direct current, the former may be agitated in a suitable vessel with a sufficient quantity of the granular material to achieve the desired result, said vessel containing electrodes to which a high potential is applied, or said granular material may have been previously subjected to a high electrical potential. Furthermore, our invention contemplates the use of any number of beds of granular material as well as recirculation of the effluent through one or more of these beds. Treatment of fluids containing bacteria in accordance with our invention may be preceeded or followed by any other treatments to remove or kill bacteria if desired.

The electric current which is applied to the dielectric material is preferably from about 100 volts D. C. to about 2000 volts D. C. and even higher voltages may be employed if desired. The current density is preferably kept as low as possible in order to avoid undesired decomposition of any salts which may be present in the fluid medium or of the fluid medium itself. Furthermore, if it be desirable to recover the bacteria in a virulent condition, the current density should not be high enough to kill the bacteria.

Our invention is not limited to the purification of liquids such as water, but is applicable to the purification of any liquid or gas. If gases are to be purified, such as for example, air, it is preferable that the granular material be maintained in a damp or a wet condition, thus for example, air may be bubbled through a column packed with granular material through which a high potential electrical current is applied either with the column being kept substantially full of water or with water trickling or being sprayed down over the surface of the granular material. Gases may also be passed over the granular material after first being saturated with water vapor. If this method be employed it may be desirable to carry out the process at temperatures ranging from room temperature up to about 50° C.

Our invention is especially adapted to the removal of bacteria carrying a negative charge although it is not limited thereto. However, the results of the removal of bacteria from fluid media is especially high in the case of negatively charged bacteria such as B. coli and the like.

Obviously, many modifications and variations in the processes and compositions described above may be made without departing from the spirit and scope of the invention as defined in the appended claims.

We claim:

1. A process for removing bacteria from aqueous media which comprises activating a granular dielectric material by applying a direct electric current potential of about 100-2000 volts thereto, in the presence of an aqueous liquid by means of electrodes of such size and so spaced that the current passing between such electrodes when liquid is present is insufficient to kill bacteria in said last-mentioned liquid, and passing an aqueous medium containing bacteria through a bed of the resulting activated dielectric material.

2. A process which comprises passing an aqueous medium containing bacteria through a bed of a granular dielectric material which is activated by applying a direct electric current potential of about 100–2000 volts thereto, by means of electrodes of such size and so spaced that the current passing between such electrodes when said aqueous media is present is insufficient to kill bacteria in said liquid.

3. A process as in claim 2 wherein the granular dielectric material is sand.

4. A process as in claim 2 wherein the aqueous medium contains *B. coli*.

5. A process which comprises passing an aqueous medium containing bacteria through a bed of a granular dielectric material which is activated by applying a direct electric current potential of about 100–2000 volts thereto, by means of electrodes of such size and so spaced that the current passing between such electrodes when said aqueous media is present is insufficient to kill bacteria in said liquid, and collecting at least a portion of the effluent which contains a lower concentration of bacteria than said medium.

GARNET PHILIP HAM.
ROBERT BOWLING BARNES.

REFERENCES CITED

The following references are of record in the file of this patent:

UNITED STATES PATENTS

| Number | Name | Date |
|---|---|---|
| 1,738,801 | Shemitz et al. | Dec. 10, 1929 |
| 517,499 | Wagner et al. | Apr. 3, 1894 |
| 1,992,974 | Thompson | Mar. 5, 1935 |
| 2,297,601 | Williams | Sept. 29, 1942 |

FOREIGN PATENTS

| Number | Country | Date |
|---|---|---|
| 65,846 | Germany | Nov. 30, 1892 |
| 149,966 | Austria | June 25, 1937 |

OTHER REFERENCES

Turneaure et al., "Public Water Supplies," Third Edition, copyrighted 1924, published by John Wiley & Sons, pages 426–429.

Falk, "Electrophoresis of Bacteria," published in vol. II of "Colloid Chemistry," by Alexander, 1928, by the Chemical Catalog Co., pages 738 and 742.